(12) United States Patent
Horn

(10) Patent No.: US 8,315,721 B2
(45) Date of Patent: Nov. 20, 2012

(54) PARAMETERIZING AN AUTOMATION DEVICE

(75) Inventor: Steffen Horn, Blomberg (DE)

(73) Assignee: Phoenix Contact GmbH & Co. KG (DE)

( * ) Notice: Subject to any disclaimer, the term of this patent is extended or adjusted under 35 U.S.C. 154(b) by 422 days.

(21) Appl. No.: 12/362,731

(22) Filed: Jan. 30, 2009

(65) Prior Publication Data
US 2009/0198353 A1 Aug. 6, 2009

(30) Foreign Application Priority Data

Jan. 31, 2008 (DE) .......................... 10 2008 007 138

(51) Int. Cl.
*G05B 19/42* (2006.01)
*G06F 9/00* (2006.01)
*G06F 15/177* (2006.01)

(52) U.S. Cl. ............................................. 700/86; 713/1

(58) Field of Classification Search ............... 700/86; 713/1; 340/3.5
See application file for complete search history.

(56) References Cited

U.S. PATENT DOCUMENTS

| | | | | |
|---|---|---|---|---|
| 2004/0002799 A1* | 1/2004 | Dabbish et al. | ................. | 701/35 |
| 2008/0109237 A1* | 5/2008 | Suess et al. | ....................... | 705/1 |
| 2009/0309692 A1* | 12/2009 | Chomik et al. | ................ | 340/3.5 |
| 2010/0179669 A1* | 7/2010 | Wegener et al. | ................ | 700/12 |

FOREIGN PATENT DOCUMENTS

| | | |
|---|---|---|
| DE | 10 2006 005 709 A1 | 9/2007 |
| WO | 2005022279 A1 | 3/2005 |
| WO | 2006114112 A1 | 11/2006 |
| WO | 2007122117 A1 | 11/2007 |

OTHER PUBLICATIONS

"LonMark Verknuepfungsvorlagen","Disigo RXC Applikationsbibliothek", Aug. 25, 2005, pp. 1-38, vol. 2, Publisher: Siemens Building Technolgoies Building Automation, Published in: DE.
Poellmann, H., "European Application No. 09001075.5 Search Report", Jun. 22, 2009, Publisher: EPO, Published in: EP.
G. Wellenreuther and D. Zastrow, "Automation with PLC", 2001, pp. 1-29, Publisher: XP-002309008, ISBN 3-528-03910-8.
"European Office Action for European International Application No. 09 001 076.2-2206", Dated: Apr. 21, 2011, Publisher: European Patent Office, Published in: EP.

* cited by examiner

*Primary Examiner* — Mohammad Ali
*Assistant Examiner* — Silvalingam Sivanesan
(74) *Attorney, Agent, or Firm* — Kaplan Breyer Schwarz & Ottesen, LLP

(57) ABSTRACT

The invention pertains to a method for parameterizing an automation device, in which at least one control parameter is defined (101) in order to specify a control characteristic of the automation device and a device parameter is assigned (103) to the at least one control parameter in order to specify a device characteristic of the automation device.

9 Claims, 4 Drawing Sheets

FIG. 2

| | | Name | Data Type | Description | Terminal | Initial Value | Auto... |
|---|---|---|---|---|---|---|---|
| 1 | | | | | | | |
| 2 | ⊞ | SD11_input0_channel1 | SAFEBOOL ▶ | NewGroup | | | ☐ |
| 3 | ⊞ | | ◆ SAFEBOOL | ◀ Automatically generated IO variables ▶ | | | |
| 4 | ⇄ | SDI1 | ◆ SAFEBYTE | | #2 IB IL 24 SDI 8 ... | | ☐ |
| 5 | ⇄ | SDI2 | ◆ SAFEDWORD | | #2 IB IL 24 SDI 8 ... | | ☐ |
| 6 | ⇄ | SDI3 | ◆ SAFEINT | | #2 IB IL 24 SDI 8 ... | | ☐ |
| 7 | ⇄ | SDI4 | ◆ SAFETIME | | #2 IB IL 24 SDI 8 ... | | ☐ |
| 8 | ⇄ | SDI5 | ◆ SAFEWORD | | #2 IB IL 24 SDI 8 ... | | ☐ |
| 9 | ⇄ | SDI6 | SAFEBOOL | | #2 IB IL 24 SDI 8 ... | | ☐ |
| 10 | ⇄ | SDI7 | SAFEBOOL | | #2 IB IL 24 SDI 8 ... | | |
| 11 | ⇄ | SDI8 | SAFEBOOL | | #4 IB IL 24 SDO ... | | |
| 12 | ⇄ | SDO1 | SAFEBOOL | | #4 IB IL 24 SDO ... | | |

PARAMETERIZING AN AUTOMATION DEVICE

FIELD OF INVENTION

The present invention pertains to the field of control engineering or automation.

BACKGROUND OF INVENTION

In modern automation systems, an increasing separation between a control system, a communication system and the device level can be observed, wherein more and more control intelligence is integrated into the field devices as part of the decentralizing effort. In this context, the parameterization of the device functions becomes more and more important with respect to ensuring a reliable system function.

In known automation systems, proprietary mechanisms of integrated device parameterization are frequently utilized such that external devices that do not feature these proprietary mechanisms cannot be used. This is the reason why it is important to realize an open and standardized design of interfaces, wherein an optimally integrated parameterization of external devices is of the essence.

Due to the separation of the control level and the device or instrument level, the required parameterization steps are frequently carried out separately. For example, the control system is parameterized on the control level and the device is parameterized on the device level. Furthermore, variables that, for example, have an I/O-reference to the channels on the respective devices are used in the control. In order to use these channels, they need to be parameterized prior to the operation of the respective device because the corresponding function can only be assigned to these channels on the devices by means of the parameterization.

Consequently, the separation of the two aforementioned steps is associated with certain problems, at least in automation systems, namely because they can lead to different tooling, a different project storage and an inconsistency of the device parameterization and the control parameterization.

SUMMARY OF INVENTION

The present invention aims to develop an efficient concept for the device parameterization and the control parameterization of an automation device.

This objective is attained with the characteristics of the independent claims.

The invention is based on the notion that an efficient parameterization of an automation device can be realized if the control parameterization and the device or instrument parameterization can be carried out jointly or, in particular, in one step. This makes it possible to achieve an efficient integration of the device or channel parameterization into control systems, namely with simplified operating sequences and a reduced probability of application errors. This is particularly advantageous, among other things, in the parameterization of safety-relevant devices. The parameterization can be carried out by means of a computer program such that the term parameterization of an automation device may, according to one embodiment, also refer to the programming thereof.

According to one aspect, the invention pertains to a method for parameterizing an automation device that comprises the step of defining at least one control parameter in order to specify a control characteristic of the automation device and the step of assigning a device parameter to the at least one control parameter in order to specify a device characteristic of the automation device.

According to one variation of the method, the device characteristic is assigned to the automation device in response to the assignment of the automation device parameter to the at least one control parameter.

According to one variation, the definition process and the assignment process are carried out in one step.

According to one variation, the device parameter comprises a filter parameter or a sensor parameter or a voltage supply parameter or an output parameter or an input parameter or a test parameter or a start-up parameter of the automation device.

According to one variation, the control parameter comprises at least one control variable.

According to one variation, the definition of the at least one control parameter and the assignment of the automation device attribute may be realized in a control program.

According to one aspect, the invention pertains to a program-controlled automation device that is designed for executing a control program, wherein at least one control parameter of the automation device can be input when the control program is executed in order to specify the control characteristic of the automation device, and wherein a device parameter can be assigned to the at least one control parameter in order to specify a device characteristic of the automation device.

According to one embodiment, the program-controlled automation device is furthermore designed for executing a control program for carrying out the method for parameterizing an automation device.

According to one aspect, the invention pertains to a parameterizable automation device for controlling a process that features an interface for inputting a control parameter in order to specify a control characteristic of the automation device and for inputting a device parameter in order to specify a device characteristic of the automation device, as well as a processor for adjusting the operating state of the automation device in response to the device parameter.

According to one embodiment, the parameterizable automation device is designed for controlling a process by utilizing the control parameter.

According to one aspect, the invention pertains to a control program for parameterizing an automation device, wherein the program code of said control program serves for carrying out the inventive method when the program is executed on a computer.

BRIEF DESCRIPTION OF THE DRAWINGS

Other exemplary embodiments are described in greater detail below with reference to the enclosed drawings. In these drawings:

FIG. 2 shows a program input field;

DETAILED DESCRIPTION

Figure 1:
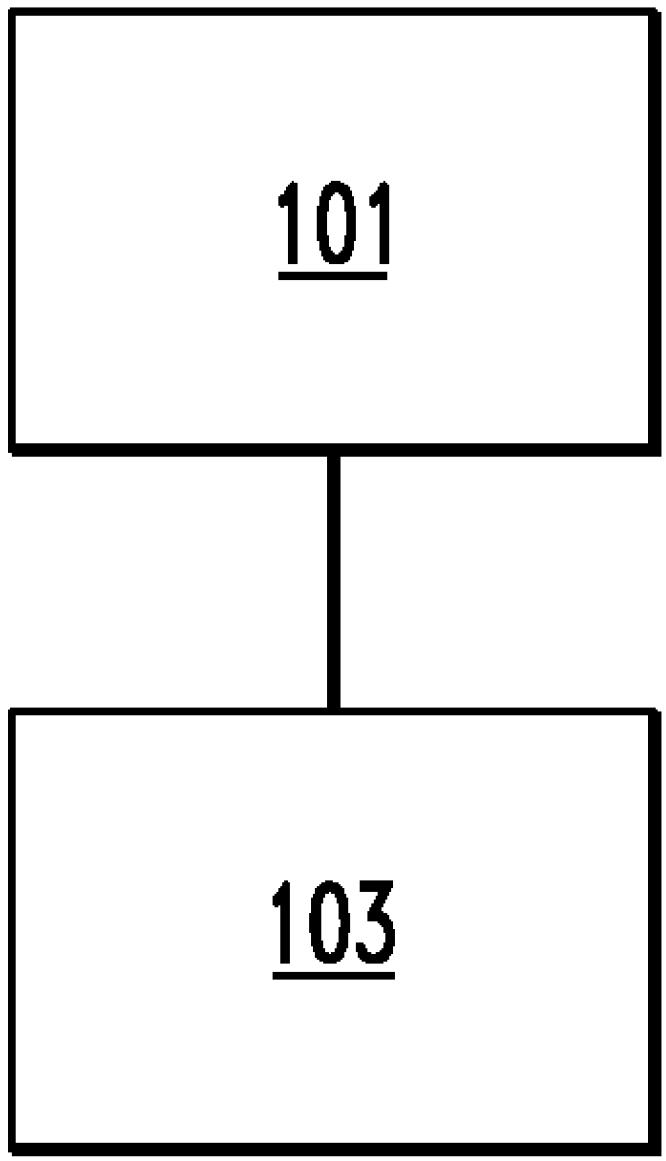
FIG. 1 shows a simplified flow chart of a method for parameterizing an automation device.

FIG. 1 elucidates the parameterization of a not-shown automation device, wherein at least one control parameter of the automation device that specifies a control characteristic thereof is defined in step 101. The declaration or the definition of the control variables or control parameters, as well as the actual control programming, therefore can be carried out in step 101.

In step 103, a device parameter is assigned to the control parameter in order to specify a device characteristic. This means that the control level and the device level are jointly parameterized. Consequently, all application-specific parameterizations of a terminal or a channel can be carried out directly during the variable declaration, for example, in a control program.

During the variable declaration, for example, the user is able to specify the data type, e.g., in accordance with IEC 61131 and, if applicable, an address or a connection to a terminal. In this case, it is advantageous to assign to the variables certain properties that may be described, for example, in the form of attributes. These may consist, for example, of an SIL-level (SIL: Safety Integrity Level) or a channel type for SafeBool-variables, of filter times of inputs or of distances or spacings of sensors.

With respect to continuously recurring channel properties, for example, in a sensor system in an I/O-link, the user is preferably able to specify a device parameter in the form of a channel data type that can be subsequently assigned during the declaration of the control program variable. The channel data type may consist, for example, of a device-specific parameter or of a parameter set that defines the channel characteristics. The system is preferably designed in such a way that, for example, a singular input suffices and the system automatically ensures that the respective I/O-channel that, for example, is linked to the respective variable is automatically parameterized in a suitable fashion. This makes it possible to simplify the device handling and the parameterization, the programming, the start-up and the parameterization test, for example, when a device is replaced.

According to one embodiment, the programming, the device parameterization and the wiring or producing of connections can be combined into one step. However, these processes can also be carried out separately. The inventive concept furthermore makes it possible to also embed the management of the I/O-channel linked to the respective variable, for example, in at least one programming system, wherein the management comprises, for example, the parameterization process itself or plausibility checks of the channel parameterization or plausibility checks of the utilization of a signal in a program such as, for example, the check of the utilization of a two-channel SIL-3-input. The management may furthermore comprise the storage of the parameterization values or, if so required, the automatic download of the parameterization values to a corresponding channel during start-up or when a device is replaced, namely in response to a device request and in a program-controlled fashion.

The inventive automation device comprises, for example, a control device and an optional communication system with a field bus and/or Ethernet functionality. The automation device is designed in such a way that the device characteristic such as, for example, the device and/or channel parameterization can be specified together with the variable declaration of the control characteristic in one processing step, for example, directly in an engineering window of the control program.

The device parameters may consist, for example, of a specification that indicates whether or not a channel is assigned, whether a connection consists of a one-channel or a two-channel connection, whether the sensor consists of an intelligent sensor or a standard sensor or which monitoring times are provided for a reaction time. The device characteristic may furthermore comprise the assignment of the clock pulse of the individual channels, for example, in order to detect short or cross flows or time discrepancies. The device characteristic may furthermore indicate whether a discrepancy monitoring is switched on or off.

Figure 3:
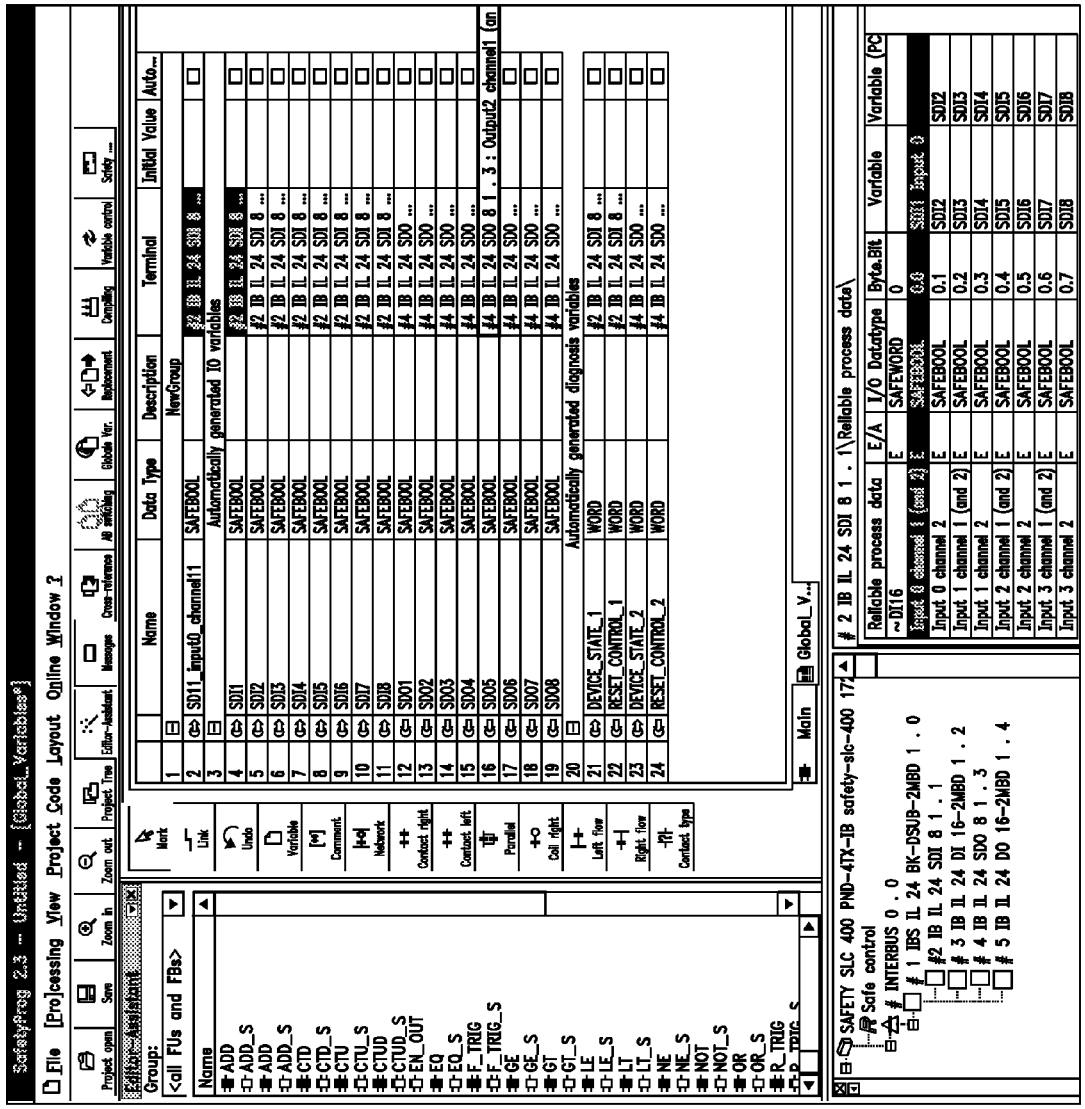
FIG. 3 shows a program input field.
Figure 4:
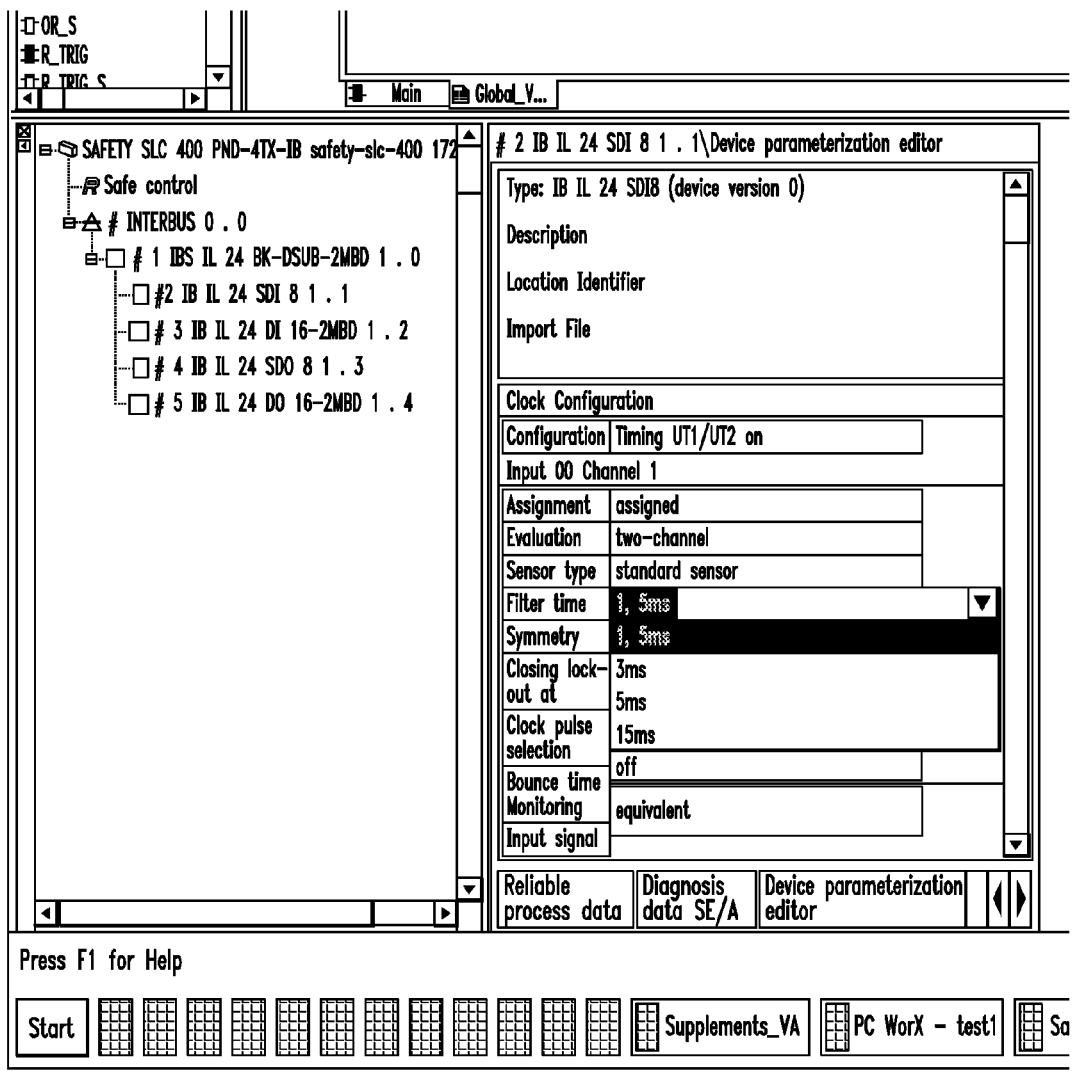
FIG. 4 shows a program input field.

The steps that, according to the invention, can be carried out jointly are elucidated separately in FIGS. 2, 3 and 4 with the aid of program-controlled data entry dialogs.

According to FIG. 2, a variable can initially be defined in a control program together with the specification of a data type of the variable, for example, SafeBool. In another step, this variable can be assigned to an I/O-channel of the peripheral equipment as shown in FIG. 3. The device or channel parameterization can be carried out in another step that is illustrated in FIG. 4. The device parameters may consist, for example, of a filter time of 1.5 ms, a symmetry of 1.5 ms, a closing lock-out at, for example, 3 ms, a clock pulse selection at, for example, 5 ms or a bouncing time monitoring at, for example, 15 ms. In this case, the time intervals can be arbitrarily adjusted within predetermined limits.

In a joint variation of the aforementioned steps, the definition of the incorrect data type can be prevented in the step according to FIG. 2. In the second step according to FIG. 3, it is possible to preclude an incorrect or even a multiple assignment of the data type. In the third step according to FIG. 4, it is possible to prevent an incorrect parameterization or an incorrect assignment of the channel such that the overall system reliability is improved.

According to the invention, the steps illustrated in FIGS. 2, 3 and 4 can be illustrated in a combined fashion and in a common data entry dialog. A certain parameterization profile is initially defined that comprises, for example, a parameter set, a parameter type or an enhanced data type that is respectively assigned, for example, a uniquely defined identifier. During the specification of the variable, it is preferred to not only define its data type, but also the corresponding parameterization profile, for example, with a parameter type or an enhanced data type. The profile or parameter transmission can be carried out by the system that makes it possible, for example, to realize the parameterization by means of an automatic download, e.g., during a system start-up or when a device is replaced. With reference to FIG. 2, this could be realized, for example, with a new column "parameter profile" that is arranged adjacent to the column "data type" and features the options SafeBool, SafeInt, etc., in the first selection dialog box. Pre-defined or self-defined parameterization profiles for certain applications such as, for example, an emergency shut-off or for a safety door preferably can also be made available to a user in this dialog box. The specified parameter profile may, for example, be statically assigned to a channel and transmitted once during a system start-up. This parameter set, in particular, can be transmitted anew when a device is replaced. In order to realize dynamic parameter changes during an operation, for example, in order to dynamically re-parameterize a channel, an application program is granted access to this parameter set or at least to the identifier of the parameter set. This makes it possible to realize the parameterization automatically and dynamically.

What is claimed is:

1. A method for parameterizing an automation device, comprising:
receiving, by the automation device, a control parameter, wherein the control parameter is inputted via an interface, defining, by the automation device, the control parameter in order to specify a control characteristic of the automation device, and assigning, by the automation device, a device parameter to the control parameter in order to specify a device characteristic of the automation device,
wherein the defining and assigning are jointly carried out in one step,
wherein the definition of the control parameter and the assignment of the device parameter are realized in one processing step directly in an engineering window of a control program, and
wherein the device characteristic is assigned to the automation device in response to the assignment of the automation device parameter to the control parameter.

2. The method according to claim 1, wherein the device parameter comprises a filter parameter or a sensor parameter or a voltage supply parameter or an output parameter or an input parameter or a test parameter or a start-up parameter of the automation device.

3. The method according to claim 1, wherein the control parameter comprises at least one control variable.

4. The method according to claim 1, wherein the defining of the control parameter and the assigning of the automation device attribute are carried out in the control program.

5. A non-transitory computer-readable medium for storing a control program for parameterizing an automation device with a program code for carrying out the method according to claim 1 when the control program is executed on a computer.

6. A program-controlled automation device that is designed for executing a control program, wherein a control parameter of the automation device can be input when the control program is executed such that the control parameter is definable in order to specify the control characteristic of the automation device, wherein a device parameter is assignable to the control parameter in order to specify a device characteristic of the automation device, wherein the control parameter is definable and the device parameter is assignable jointly in one step,
wherein the definition of the control parameter and the assignment of the device parameter are realized in one processing step directly in an engineering window of a control program, and
wherein the device characteristic is assigned to the automation device in response to the assignment of the automation device parameter to the control parameter.

7. The program-controlled automation device according to claim 6, wherein executing the control program comprises:
(i) defining the control parameter in order to specify the control characteristic, and
(ii) assigning the device parameter to the control parameter in order to specify the device characteristic.

8. A parameterizable automation device comprising: an interface for inputting a control parameter in order to specify a control characteristic of the automation device and for inputting a device parameter in order to specify a device characteristic of the automation device, wherein the control parameter is definable and the device parameter is assignable jointly in one step, wherein inputting the control parameter and the device parameter are realized in one processing step directly in the interface of a control program, and wherein the device characteristic is assigned to the automation device in response to the assignment of the automation device parameter to the control parameter, and
a processor for adjusting an operating state of the automation device in response to the device parameter.

9. The parameterizable automation device according to claim 8 that is designed for controlling a process by utilizing the control parameter.

* * * * *